United States Patent [19]

Malo et al.

[11] 4,207,049
[45] Jun. 10, 1980

[54] DEVICE FOR MOLD COATING PLASTIC PARTS

[76] Inventors: Richard J. Malo, 26100 Little Mack, St. Clair Shores, Mich. 48081; Charles Malo, 36510 Birwood, Mt. Clemens, Mich. 48043

[21] Appl. No.: 12,845

[22] Filed: Feb. 16, 1979

[51] Int. Cl.² .............................................. B29F 1/10
[52] U.S. Cl. ............................... 425/129 R; 425/127; 425/130
[58] Field of Search .............. 425/130, 96, 119, 129 S, 425/808, 388, DIG. 60, 127, 129

[56] References Cited

U.S. PATENT DOCUMENTS

| | | | |
|---|---|---|---|
| 2,357,950 | 9/1944 | Goessling | 425/808 |
| 2,406,361 | 8/1946 | Fairbank et al. | 425/808 |
| 2,473,588 | 6/1949 | Johnson | 425/808 |
| 2,841,823 | 7/1958 | Van Hartesveldt | 425/388 X |
| 2,876,492 | 3/1959 | Frieder et al. | 425/DIG. 60 |
| 3,070,846 | 1/1963 | Schrier | 425/808 |
| 3,211,811 | 10/1965 | Lauman | 425/808 |
| 3,297,422 | 1/1967 | Emerson et al. | 425/808 |
| 3,319,301 | 5/1967 | Ludwig | 425/130 X |
| 3,902,693 | 9/1975 | Crandon et al. | 425/808 |

*Primary Examiner*—J. Howard Flint, Jr.

*Attorney, Agent, or Firm*—Basile and Weintraub

[57] ABSTRACT

A device and method for mold coating plastic parts producing a class A finish is disclosed. The method of mold coating plastic parts includes the steps of molding the part; allowing the part to solidify; opening the mold a controlled distance and maintaining a seal between the parts of the mold, while holding the part in the core of the mold; injecting a measured amount of coating material into the space; and closing the mold to form and cure the coating material. The device includes a seal disposed around the perimeter of the mold at the surfaces separating the halves of the mold. The seal is configured to allow the halves of the mold to be separated by as much as 0.100 inches or greater without breaking the seal between the mold halves. When the halves of the mold are separated to create the space a vacuum may be created in the space between the surface of the mold and the surface of the part to augment dispersion of the coating. A controlled amount of coating material is injected into the space and the mold is closed to cure the coating material and bond the coating to the part. The resulting part has a class A finish which duplicates the finish of the surface on the inside of the cavity.

6 Claims, 5 Drawing Figures

DEVICE FOR MOLD COATING PLASTIC PARTS

BACKGROUND OF THE INVENTION

I. Field of the Invention

The present invention relates to the field of molding and molded parts and in particular the field of coating molded parts. More particularly the present invention relates to the field of mold coating molded parts made from thermoplastic compounds to produce a class A finish on the surfaces of the part.

II. Prior Art Statement

The need for a class A finish on injection molded and structural foam parts made from synthetic resinous materials has long been known. Normally parts made from such materials, especially thermoplastic materials have pores and cracks which require filling and hand finishing to produce a surface that can be painted or otherwise finished. One method for mold coating an injection molded or structural foam part to achieve a satisfactory finish includes spraying a coating on the inside of the mold on the surfaces where the improved finish is desired before closing the mold. The plastic material is then injected into the mold. This method is unsatisfactory in that the injected material tends to wash away the coating at the point of injection. Another alternative is to merely secondarily paint the surface.

U.S. Pat. No. 4,081,578 disclosed a method for mold coating sheet molded compound parts by opening the mold after the part has been formed. A measured amount of coating material is then injected into the mold in the space between the surface of the mold and the surface of the part. The mold is then closed to distribute the coating material over the part. The coating material is then cured. The mold is, then, opened and the part ejected from the mold. This process is capable of producing a class A finish on the part. However, when the mold is opened, air is allowed to enter the space between the surface of the mold and the surface of the part. The injecting of air into the mold introduces moisture and debris into the mold which can introduce flaws into the resulting surface finish. Furthermore the presence of moisture tends to interact with the coating material causing blemishes and a tendency for the coating to chip and peel.

German Pat. No. 2,442,227 and English Pat. No. 1,457,935 are related to the aforementioned U.S. Patent. These patents constitute the entire prior art known to the inventors.

SUMMARY OF THE INVENTION

The present invention comprises a device for coating injection molded or structural foam molded plastic parts made from thermoplastic material. The method of using the device comprises the steps of molding a part, either by injection molding or structural foam molding; allowing the part to solidify; opening the mold a controlled distance while maintaining a seal between parts of the mold and simultaneously holding the part in the core; injecting a measured amount of coating material into the space; closing the mold to harden and cure the coating material onto the part; then opening the mold and removing the part when injecting the coating material into the void between the mold surface and the part surface; it may be done at or less than atmospheric pressure.

A metallic seal is slidingly retained in a groove in one half of the mold, around the perimeter of the part, spaced out a distance from the part at its parting line along a surface separating the mold halves. The seal slides in the groove and extends above the parting surface or parting line to maintain a seal between the halves of the mold, as they are separated, for injecting a coating material. The seal sliding in the groove in one half of the mold and remaining in abutment with the other half of the mold, enables a seal to be maintained between the halves of the mold as the halves are separated. Thus, the seal allows the halves of the mold to be separated after the part has been formed. Optimally, the seal is not broken, and the mold cavity is not exposed to atmospheric pressure. However, as noted above, the present invention is still practicable where the seal is broken and the coating material is injected at atmospheric pressures. Thus, the present mold enables moving the parting line without breaking the seal between the cavity and the core.

When the mold halves have been separated the desired distance, a measured amount of coating material is injected into the void or space between the part and the mold. A coating material is injected into the void and is spread evenly over the part. The mold is, then, closed and the coating material squeezed between the part and the surface of the mold to spread the coating material evenly over the part. When the part has been removed from the mold, the surface of the part exactly duplicates the surface of the mold. An excellent mechanical bond is obtained between the coating material and the part which results in superior chipping and peeling resistance. The resulting part has a class A finish, and no priming or filling of the part is necessary prior to final painting.

Other objects, advantages, and applications of the present invention will become apparent to those skilled in the art to which the present invention pertains when the accompanying description of one example of the best mode contemplated for practicing the invention is read in conjunction with the accompanying drawing.

BRIEF DESCRIPTION OF THE DRAWING

The description herein makes reference to the accompanying drawings wherein like reference numbers refer to like parts throughout the several views and wherein.

DESCRIPTION OF THE PREFERRED EMBODIMENT

Figure 2:
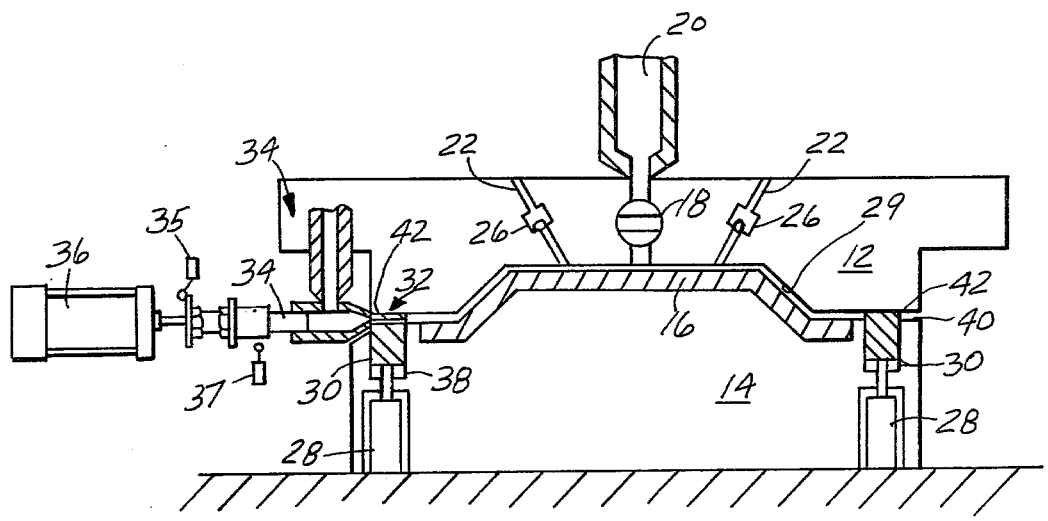
FIG. 2 illustrates a view of the device in FIG. 1 with the upper and lower halves of the mold separated a distance for the injection of the coating material.

Parts made of molded plastic have unique advantages in automotive applications in that they are light weight; having a high strength to weight ratio, and have a high corrosion resistance. However when injection molded or structural foam molded parts are to be used in visible areas of an automobile requiring a class A finish, the problems of pits, pores, fill-in ripples and sink marks make it necessary to apply considerable amount of labor to produce a surface that has an acceptable finish on the molded part. Heretofore, the procedure has been to apply a filler primer coat to the surface of the part. This fills in the cracks and other blemishes. Then the surface is hand shaped to produce the desired finish. As noted, the present invention involves the use of an in-mold coating process which evenly applies a coating material to the surface of the part and the surface coating is squeezed between the part and the surface of the mold producing a finished surface that exactly duplicates the surface finish within the mold.

The present invention uses the method of mold coating molded plastic parts comprising the steps of:
(a) molding the part;
(b) allowing the part to solidify
(c) opening the mold a controlled distance to get even distribution of the coating material while maintaining a seal between the parts of the mold;
(d) injecting a measured amount of coating material into the space between the surface of the mold and the part;
(e) closing the mold to form and cure the coating material and the part; and
(f) opening the mold and removing the part when the part and coating are cured.

The maintaining of a seal between the parts of the mold, as the mold is opened a predetermined distance, moves the parting line of the mold without creating a gap between the core and cavity of the mold. The only void created herein is between the surface of the molded part and the cavity, but not in the mold, per se. To apply the coating material into the mold the mold halves are separated from about 0.020 to about 0.040 inches. The coating material, when introduced, is injected into the cavity by any suitable mode. The amount of coating material injected is selected to fill the imperfections in the surface of the part and provide an even coating of approximately one to five mills in thickness.

After the coating material is injected, the mold is, again, closed and a pressure, for example of from about 250 to 1000 pounds per square inch is exerted on the coating. This forces the coating into all cracks, pits, ripples, and pores and against the surface of the mold. When the part and the coating have been cured, the part is ejected from the mold. The resulting surface finish of the part exactly duplicates the surface of the mold.

The resulting coating is crack and chip resistant because the high pressure used to apply the coating to the surface of the part drives the material into all cracks and crevices and assures a mechanical-chemical bond between the coating and the part. Normally, when the coating material is injected in a mold, the vacuum and the resulting repressurization of the mold distributes the coating evenly over the part. However, for longer and larger parts, a plurality of coating injecting points may be preferable for more even distribution of the coating. When the parting line is moved, optimally, less than atmospheric pressure is present in the void between the surface of the part and the surface of the mold to improve dispersion of the coating. However, this reduced pressure is not critical or essential to the practice of the present invention. What is critical is that the mold halves be separated without breaking the seal therebetween.

Figure 1:
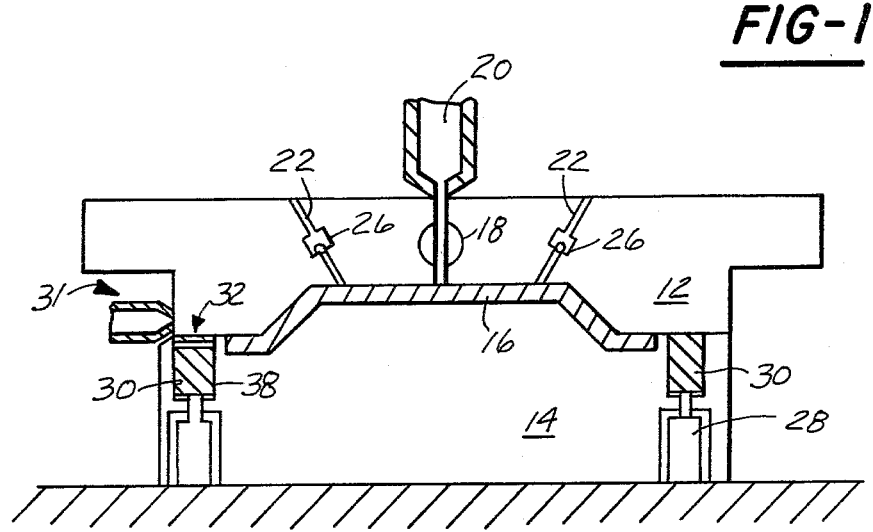
FIG. 1 illustrates a schematic drawing of a preferred embodiment of the mold.
Figure 3:
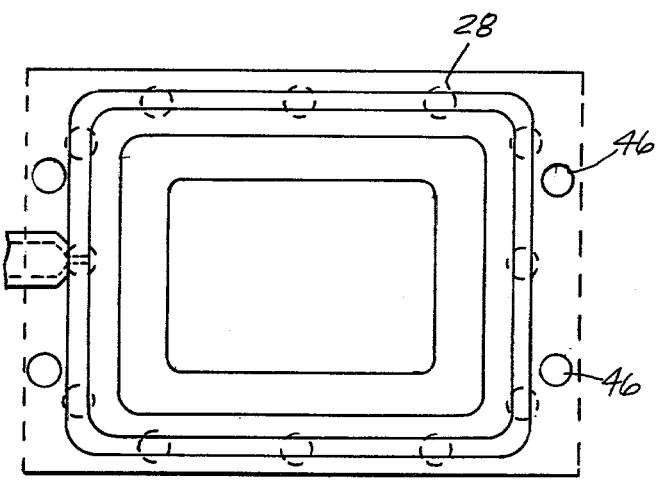
FIG. 3 illustrates a top plan view of the bottom half of the mold.

Referring now to the drawings and in particular FIGS. 1 through 3 wherein there is illustrated at 10 a preferred embodiment of the present invention for enabling movement of the parting line without breaking the seal between the mold halves. A molding apparatus, such as an injection mold or a structural foam mold has an upper half 12 and a lower half 14, which cooperate to form a cavity between the halves for forming a part 16. The mold comprises (a) hydraulic cylinders (not shown) for opening and closing the mold; (b) a means for injecting the plastic 20; (c) a perimeter seal 30; (d) a coating injection means 31 including a coating injection piston 34; (e) lift cylinders 28 to open the mold a controlled distance; and (f) a coating shut off means 32. The components listed above cooperate to produce a class A finish on a molded part 16.

Figure 4:
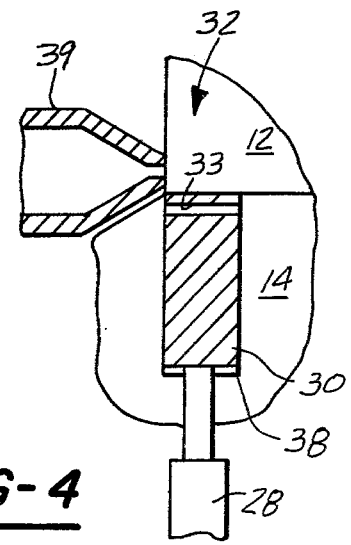
FIG. 4 illustrates an enlarged cross-sectional view of the seal with the mold closed.
Figure 5:
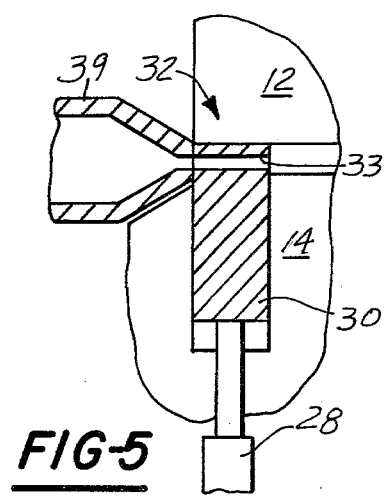
FIG. 5 illustrates a cross-sectional view of the seal in FIG. 4 with the mold halves separated for injecting the coating.

The lower half of the mold 14 has a groove 38 which surrounds the perimeter of the cavity spaced out a distance from the perimeter. The perimeter seal 30 is slidingly installed within the groove 38. The upper surface of the seal 30 is pressed against a parting surface 42 of the upper half of the mold. The seal 30, which slides in its groove 38, remains in contact with the parting surface 42 of the upper half to permit a seal to be maintained between the halves as they are separated for coating material injection. As the halves of the mold are separated, with the seal 30 maintaining a seal between the core and cavity, a void 29 is created between the surface of the part and the surface of the mold. A plurality of lift cylinders 28 are disposed beneath the seal 30 and exert a force on the seal 30 to hold it in abutment with the parting surface 42 of the upper half 12 of the mold. The lift cylinders 28 also provide the force required to separate the mold halves for injecting the coating material. The coating shut-off means 32 comprises a horizontal aperture 33 or bore formed through the seal 30; a coating injection nozzle 39 selectively abutting an outer edge of the upper half 12 and an outer edge of the seal 30 in line with the aperture 33, and the plurality of lift cylinders 28 to selectively move the aperture 33 into and out of alignment with the nozzle 39. When the halves of the mold are in abutment for injecting the plastic into the mold cavity, the seal 30 is displaced fully into its groove 38 and the aperture 33 is closed (FIG. 4). When the lift cylinders 28 separate the mold halves, the seal 30 moves upward with the upper half of the mold and the orifice 33 comes into alignment with the nozzle 39 for injection of the coating material (FIG. 5). The coating injection nozzle 39 can alternately be horizontally movable to allow the nozzle to contact the aperture 33 only during separation of the mold halves to minimize heat transfer from the mold to the nozzle to prematurely cure the paint.

As shown in FIG. 3, the groove 38 for the seal 30 is formed between the perimeter of the part 16 and the mold guide posts 46. Although the drawing depicts the groove as being formed in the core and the seal seated therewithin, it is, of course, possible to form the groove in the cavity and move the seal into and out of a cavity groove.

When the mold is closed by any suitable mode, the plastic injection means is actuated and the plastic to be molded is injected into the mold cavity. If desired, a shut-off valve 18 may be proximate the cavity to prevent premature delivery of the molding plastic to the cavity. As the plastic flows into the cavity, air is forced out of the cavity through vents 22 and 24 past check valves 26, where desired. When the cavity has been filled, the injection means 20 is turned off. After the part solidifies, the lift cylinders 28 open the mold, preferably, the opening is about 0.020 to about 0.100 inches, or otherwise as required. The perimeter seal 30 maintains a seal between the upper and the lower halves of the mold as the opening occurs. As the halves of the mold separate the space 29 is created between the surface of the upper half of the mold and the surface of the part 16. When the mold has been opened the desired distance, the movement of the seal 30 opens the shut-off valve means 32 and the injection piston 34 is stroked by a coating injection cylinder 36 to inject a predetermined amount of coating into the space between the part and the mold. Following the injecting of the coating material, the valve means 32 is closed as the mold is closed and the mold is repressurized to a pressure from about 250 to about 1000 psi across the surface of the part. Re-closing of the mold causes return of the parting line to substantially its original position while evenly distributing the coating material over the surface of the part. As the mold is reclosed the coating material and the part are cured. When the cure is completed, the mold is opened, the part ejected, and a part having a superior finish which duplicates the finish of the interior of the mold has been created. The stroke of the injection piston 34 and hence the amount of coating material injected through the coating means 31 is controlled by the position of a pair of limit switches 35, 37 or other means.

In coating parts that have sections of varying thickness special care must be taken to allow for the fact that thicker sections of the parts deflect and compress more than the thin sections under hydraulic pressure when the mold is reclosed. The excess deflection of the thickened parts enables a larger amount of coating to collect in the sink area. When the curing pressure is released and the mold opened the thicker part recovers more than the thin part creating a slight hump. If this condition is encountered, the size of the hump can be reduced by using a reduced pressure for curing the coating when the mold has been reclosed after the coating material has been injected.

The coating material can comprise any suitable material such as a polyester or polyether polyurethane coating compositions. In addition, polyesters can be used, such as those produced by the reaction of a polyhydric compound with a dicarbosylic acid, acrylics and the like, as well as mixtures thereof can be used herein. Likewise, other liquid thermoset materials are contemplated as useful coating materials in the practice hereof. A preferred system comprises a mixture of unsaturated polyester and a polyether urethane. The polyester provides hardness and the urethane provides adhesion of the coating to the base material. The coating cures to its polymerized condition (Rockwell R105 hardness) at from 125° F. to about 300° F. in about one-half to about one minute.

In the practice of the present invention any thermoplastic material can be inmold coated in accordance herewith including polyphenylene oxide, polycarbonate, ABS resins, polystyrene and polyolefins providing a compatible coating material is used including those listed above. The present invention is particularly amenable for coating any of the thermoplastics with a polyurethane coating.

While the drawings illustrate the injection of the coating material at one point in the mold, it may be desirable to inject the coating material at several points in the mold, particularly for longer parts. For larger parts it may, also, be desirable to introduce the coating material at several points within the mold to advance the evenness of the coating.

After the mold has been repressurized and the coating cured, the resulting coating has an average thickness of 1 to 5 mils.

The inmold coating process of the present invention is particularly amenable for injection molding and structural foam molding.

It should be noted that although the present invention has been described with reference to a vertically oriented mold, it is equally applicable to a horizontal mold. Again, the criticality is in that the parting line is moved without breaking the seal between the core and the cavity while injecting the coating material.

Having thus described our invention what we claim is:

1. A device for mold coating plastic parts comprising:
   A mold comprising an upper half and a lower half, the halves cooperating to define a mold cavity therebetween in which a plastic part is capable of being formed;
   a means for sealing extending between the upper and lower halves of the mold and disposed at a parting line formed in the cavity around the perimeter of a part formed in the mold;
   means for moving the means for sealing, the means for sealing permitting the halves of the mold to be separated a first predetermined distance without breaking the seal therebetween created by the means for sealing when the means for sealing is moved responsive to the means for moving, and
   means for injecting a measured amount of a coating material into a remaining part of the mold cavity created between a part formed in the cavity and one of the mold halves when the mold halves are separated a second predetermined distance contemporaneous with the movement of the means for sealing.

2. A device for mold coating plastic parts as defined in claim 1 further comprising:
   means for controlling the amount of separation between mold halves; and
   means for reclosing the mold to form and cure the coating.

3. A device for mold coating plastic parts as defined in claim 2 wherein the means for separating the halves of the mold comprises a cylinder.

4. A device for mold coating plastic parts as defined in claim 1 wherein:
   one-half of the mold has a groove formed therein and created around the perimeter formed in the cavity;
   the means for sealing being slidingly disposed in the groove, an outer surface of the seal remaining in contact with the other half of the mold as separation between halves occurs.

5. A device for mold coating injection molded parts as defined in claim 1 wherein said means for injecting a measured amount of coating material comprises:
   a controlled stroke injection piston.

6. The device of claim 5 wherein the seal is a metallic strip having a bore formed therethrough, the bore being movable into communication with the space created between the part and the cavity and the piston, the bore defining means for delivery coating to the space.

* * * * *